(12) United States Patent
Ho et al.

(10) Patent No.: US 10,822,522 B2
(45) Date of Patent: Nov. 3, 2020

(54) MODIFIED POLYIMIDE COMPOUND, RESIN COMPOSITION AND POLYIMIDE FILM

(71) Applicant: Zhen Ding Technology Co., Ltd., Tayuan, Taoyuan (TW)

(72) Inventors: Ming-Jaan Ho, Taoyuan (TW); Mao-Feng Hsu, Taoyuan (TW); Shou-Jui Hsiang, Taoyuan (TW); Nan-Kun Huang, Taoyuan (TW); Yu-Wen Kao, Taoyuan (TW); Chia-Yin Teng, Taoyuan (TW); Ching-Hsuan Lin, Taoyuan (TW)

(73) Assignee: Zhen Ding Technology Co., Ltd., Tayuan, Taoyuan (TW)

( * ) Notice: Subject to any disclaimer, the term of this patent is extended or adjusted under 35 U.S.C. 154(b) by 0 days.

(21) Appl. No.: 16/533,932

(22) Filed: Aug. 7, 2019

(65) Prior Publication Data
US 2019/0359852 A1    Nov. 28, 2019

Related U.S. Application Data

(62) Division of application No. 15/689,166, filed on Aug. 29, 2017, now Pat. No. 10,428,238.

(30) Foreign Application Priority Data

Jan. 16, 2017    (TW) .............................. 106101438 A

(51) Int. Cl.
C09D 179/08    (2006.01)
C08L 63/00    (2006.01)
C08G 73/10    (2006.01)

(52) U.S. Cl.
CPC ......... *C09D 179/08* (2013.01); *C08G 73/101* (2013.01); *C08G 73/1028* (2013.01);
(Continued)

(58) Field of Classification Search
None
See application file for complete search history.

(56) References Cited

U.S. PATENT DOCUMENTS

| | | | | |
|---|---|---|---|---|
| 8,080,319 B2 * | 12/2011 | Tanaka | ............... | C08G 59/4042 428/413 |
| 2001/0031828 A1 * | 10/2001 | Honda | ................... | C09J 163/00 525/107 |
| 2009/0182116 A1 * | 7/2009 | Lin | ...................... | C07F 9/5031 528/352 |

FOREIGN PATENT DOCUMENTS

| CN | 1509317 A | 6/2004 |
|---|---|---|
| CN | 104559059 A | 4/2015 |

OTHER PUBLICATIONS

Ching Hsuan Lin, et al., Organo-soluble phosphinated polyimides from asymmetric diamines, Polymer, Jun. 19, 2010, 3899-3906, 51, Elsevier Ltd., www.elsevier.com/locate/polymer.

* cited by examiner

*Primary Examiner* — Ana L. Woodward
(74) *Attorney, Agent, or Firm* — ScienBiziP, P.C.

(57) ABSTRACT

A resin composition comprises a modified polyimide compound, an epoxy resin, and a solvent. The modified polyimide compound has a chemical structural formula of

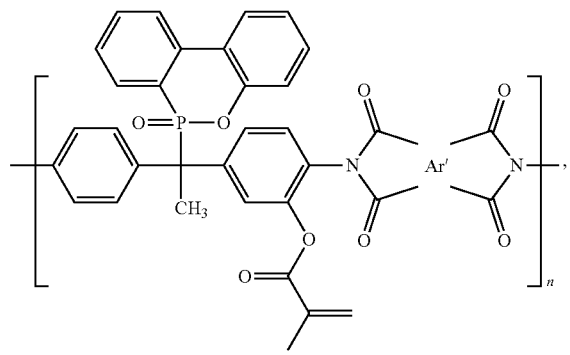

the Ar' represents a group selected from a group consisting of phenyl having a chemical structural formula of

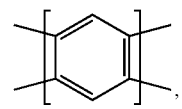

diphenyl ether having a chemical structural formula of

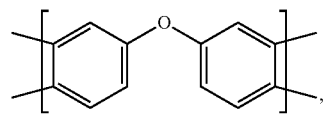

biphenyl having a chemical structural formula of

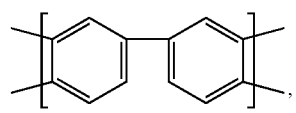

hexafluoro-2,2-diphenylpropane having a chemical structural formula of (Continued)

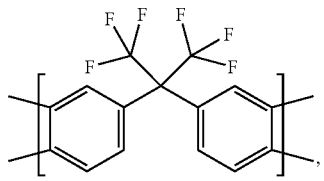

benzophenone having a chemical structural formula of

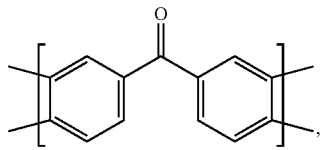

and diphenyl sulfone having a chemical structural formula of

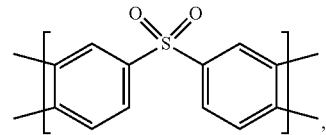

and any combination thereof, the modified polyimide compound has a degree of polymerization n of about 1 to about 50, the epoxy resin and the modified polyimide compound are in a molar ratio of about 0.1:1 to about 1:1. A modified polyimide compound and a polyimide film are also provided.

9 Claims, 2 Drawing Sheets

(52) U.S. Cl.
CPC ..... *C08G 73/1032* (2013.01); *C08G 73/1039* (2013.01); *C08G 73/1053* (2013.01); *C08G 73/1064* (2013.01); *C08G 73/1067* (2013.01); *C08G 73/1071* (2013.01); *C08L 63/00* (2013.01); *C08L 2203/202* (2013.01)

MODIFIED POLYIMIDE COMPOUND, RESIN COMPOSITION AND POLYIMIDE FILM

CROSS-REFERENCE TO RELATED APPLICATIONS

This is a divisional application of patent application Ser. No. 15/689,166, filed on, Aug. 29, 2017, assigned to the same assignee, which is based on and claims priority to Taiwan Patent Application No. 106101438 filed on Jan. 16, 2017, the contents of which are incorporated by reference herein.

FIELD

The subject matter herein generally relates to a modified polyimide compound, a resin composition, and a polyimide film.

BACKGROUND

Flexible circuit boards usually include polyimide films. Such polyimide film is formed by diamine compounds and anhydride compounds, and has a high dielectric constant $D_k$ (greater than 3.0). Thus, the flexible circuit board cannot provide an impedance match for high frequency signals to be transmitted thereto.

BRIEF DESCRIPTION OF THE DRAWINGS

Implementations of the present technology will now be described, by way of example only, with reference to the attached figures.

DETAILED DESCRIPTION

Figure 1:
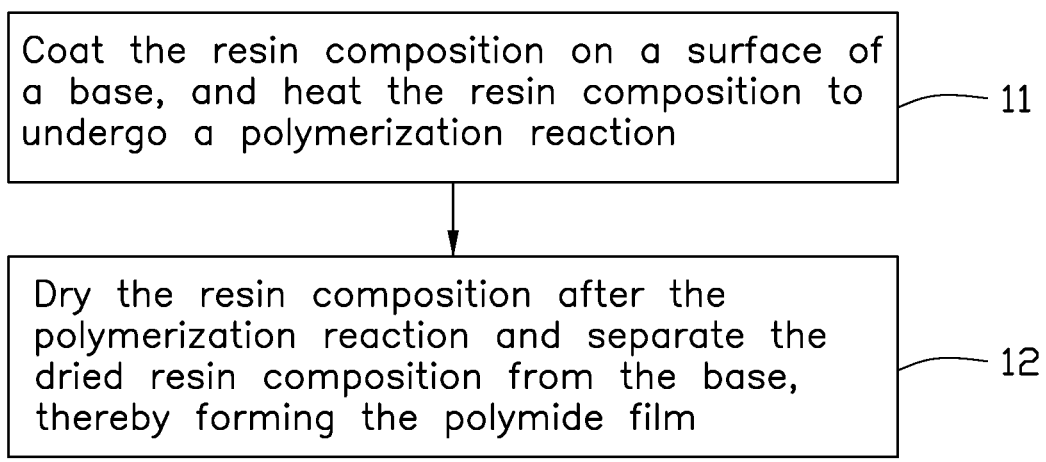
FIG. 1 is a flowchart of an exemplary embodiment of a method for manufacturing a polyimide film.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

An exemplary embodiment of a resin composition comprises a modified polyimide compound, an epoxy resin, and a solvent. In at least one exemplary embodiment, the epoxy resin and the modified polyimide compound are in a molar ratio of about 0.1:1 to about 1:1.

The modified polyimide compound has a chemical structural formula of

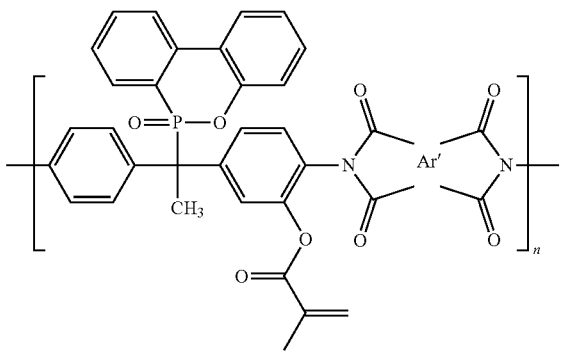

wherein Ar' represents a group selected from a group consisting of phenyl having a chemical structural formula of

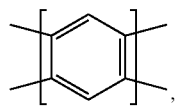

diphenyl ether having a chemical structural formula of

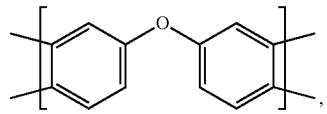

biphenyl having a chemical structural formula of

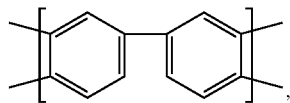

hexafluoro-2,2-diphenylpropane having a chemical structural formula of

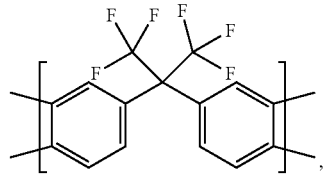

benzophenone having a chemical structural formula of

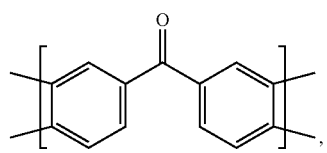

and diphenyl sulfone having a chemical structural formula of

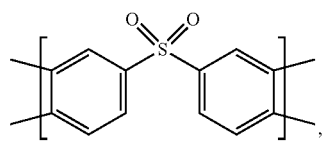

and any combination thereof. In at least one exemplary embodiment, the modified polyimide compound has a degree of polymerization of about 1 to about 50.

In at least one exemplary embodiment, the modified polyimide compound is made by the following steps:

(1)

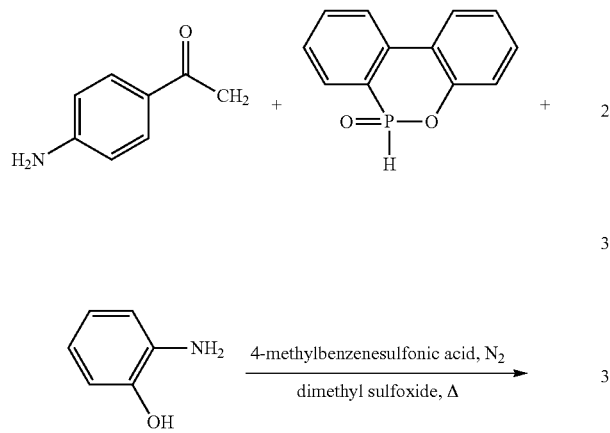

(2)

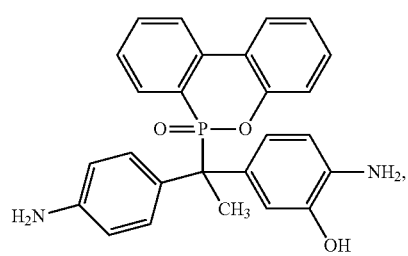

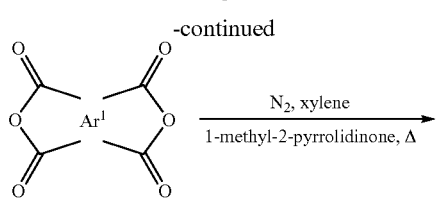

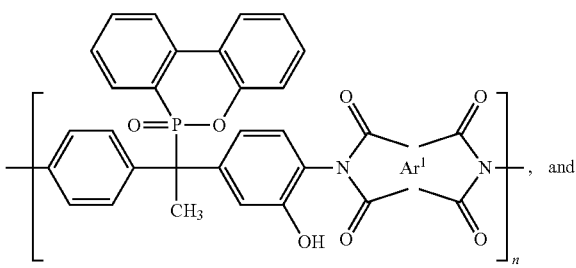

, and (3)

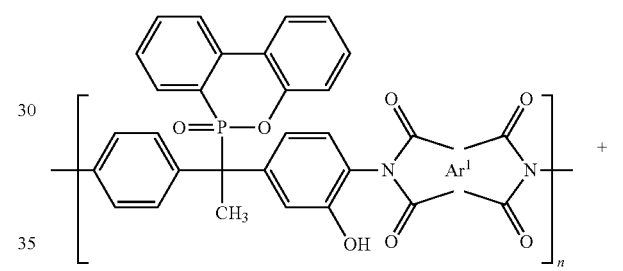

+

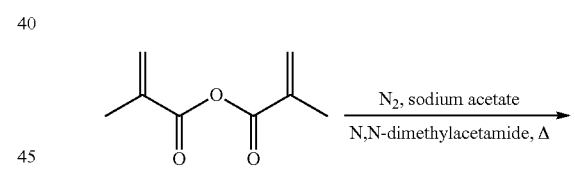

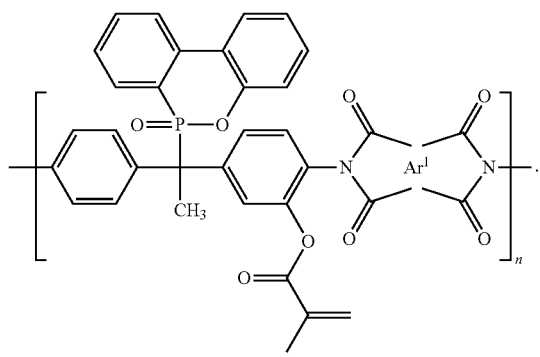

.

The epoxy resin has a chemical structure selected from a group consisting of

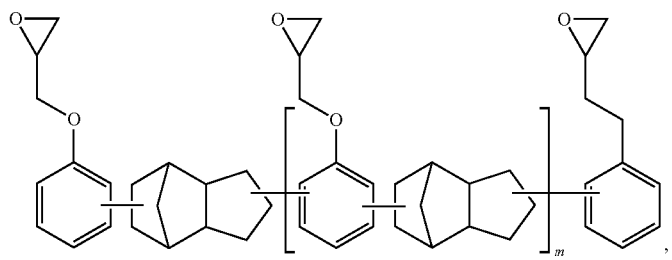

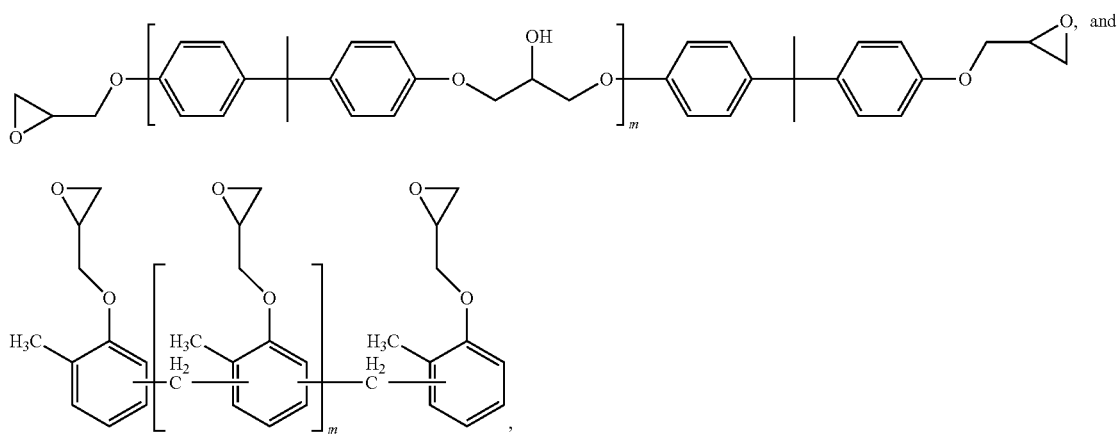

and any combination thereof.

In at least one exemplary embodiment, the solvent is N,N-dimethylacetamide.

In at least one exemplary embodiment, the resin composition can further comprise of porous materials. In this exemplary embodiment, the porous materials are molecular sieves obtainable from Tianjin Nankai University Catalyst Plant under the trade name "MCM-41". The modified polyimide compound and the porous materials are in a ratio of about 1000:1 to about 10:1 by weight.

A method for preparing the resin composition may comprise the following steps: (1) adding the modified polyimide compound, the epoxy resin, and the solvent in a vessel; (2) stirring the modified polyimide compound, the epoxy resin, and the solvent until the modified polyimide compound and the epoxy resin dissolve in the solvent.

FIG. 1 illustrates a flowchart of a method for manufacturing a polyimide film 20 (shown in FIG. 2) using the resin composition in accordance with an exemplary embodiment. The exemplary method is provided by way of example, as there are a variety of ways to carry out the method. Each block shown in the figure represents one or more processes, methods, or subroutines, carried out in the exemplary method. Furthermore, the illustrated order of blocks is by example only, and the order of the blocks can change. Additional blocks may be added, or fewer blocks may be utilized, without departing from this disclosure. The exemplary method can begin at block 11.

At block 11, the resin composition is coated on a surface of a base, and is heated to cause the modified polyimide compound and the epoxy resin to undergo a polymerization reaction. In at least one exemplary embodiment, the resin composition is placed in a furnace and heated through four heating processes. The first heating process is heating the resin composition from 25 degrees Celsius to 140 degrees Celsius and maintaining the heating of the resin composition at 140 degrees Celsius for 30 min. The second heating process is heating the resin composition from 140 degrees Celsius to 180 degrees Celsius and maintaining the heating of the resin composition at 180 degrees Celsius for 2 hours. The third heating process is heating the resin composition from 180 degrees Celsius to 200 degrees Celsius and maintaining the heating of the resin composition at 200 degrees Celsius for 2 hours. The fourth heating process is heating the resin composition from 200 degrees Celsius to 220 degrees Celsius and maintaining the heating of the resin composition at 220 degrees Celsius for 2 hours.

At block 12, after the polymerization reaction, the resin composition is dried and separated from the base, thereby forming the polyimide film 20.

Figure 2:
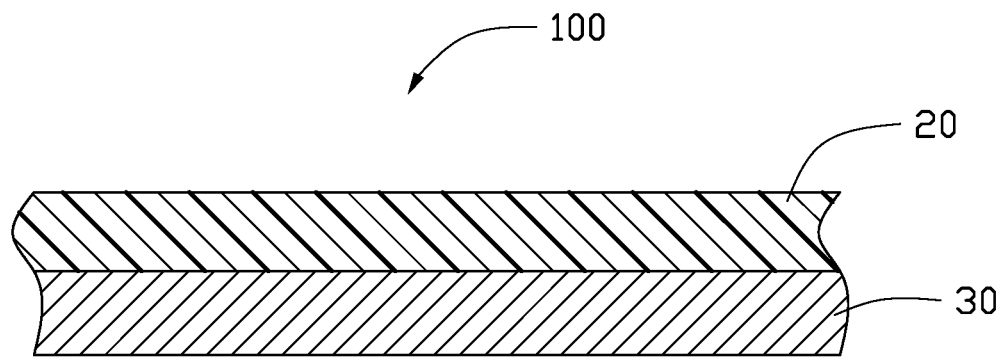
FIG. 2 is a diagram of an exemplary embodiment of a circuit board.

FIG. 2 illustrates an exemplary embodiment of a circuit board 100 comprising at least one circuit substrate 30 and a polyimide film 20 formed on at least one surface of each circuit substrate 30. The polyimide film 20 is formed by heating the resin composition, to cause the modified polyimide compound and the epoxy resin of the resin composition to undergo a polymerization reaction.

In the resin composition, the modified polyimide compound comprises acrylate groups at side chains. When the resin composition is heated to form the polyimide film 20, the acrylate groups at side chains of the modified polyimide compound and the epoxy resin react with each other, to reduce a dielectric constant $D_k$ of the polyimide film 20. Furthermore, the resin composition can form a cross-linking structure when the resin composition is heated to form the polyimide film 20, which can increase the cross-linking density of the polyimide film 20, so that heat resistance of the polyimide film 20 is improved for soldering. Thus, the polyimide film 20 can have an improved thermal resistance. Moreover, because the modified polyimide compound comprises of 9,10-dihydro-9-oxa-10-phosphaphenanthrene-10-oxide groups, the polyimide film 20 has a preferred flame retardancy. In addition, when the resin composition is comprised of porous materials, air can penetrate the porous materials of the polyimide film 20 to further decrease the dielectric constant $D_k$.

Example 1

4.8 g of 9,10-dihydro-9-oxa-10-phosphaphenanthrene-10-oxide (DOPO), 3.0 g of 4-aminoacetophenone of, 4.8 g of 2-aminophenol, 0.19 g of 4-methylbenzenesulfonic acid (P-TSA), and 10.0 g of dimethyl sulfoxide were added into a first container and stirred. The first container was heated at 100 degrees Celsius for 12 hours under a nitrogen atmosphere to form a first product having a chemical structural formula of

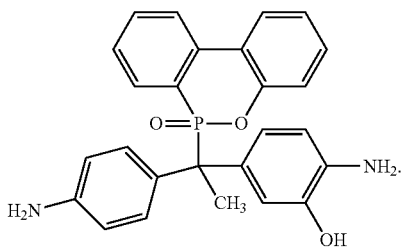 [SMILES: CC(c1ccc(N)cc1)(c1ccc(N)c(O)c1)P1(=O)Oc2ccccc2-c2ccccc21]

1.0 g of the first product, 0.7 g of 1,2,4,5-benzenetetracarboxylic anhydride, 6.8 g 1-methyl-2-pyrrolidinone (NMP), and 3.4 g xylene were added into a second container and stirred. The second container was heated at 140 degrees Celsius for 20 hours under a nitrogen atmosphere to initiate a reflux reaction to form a second product having a chemical structural formula of

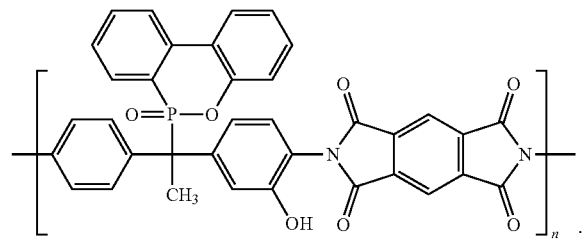

10.0 g of the second product, 3.5 g of methacrylic anhydride, 0.1 g of sodium acetate, and 100.0 g of N,N-dimethylacetamide (DMAC) were added a third container and stirred. The third container was heated at 80 degrees Celsius for 12 hours under a nitrogen atmosphere to initiate a reflux reaction to form a modified polyimide compound (I) having a chemical structural formula of

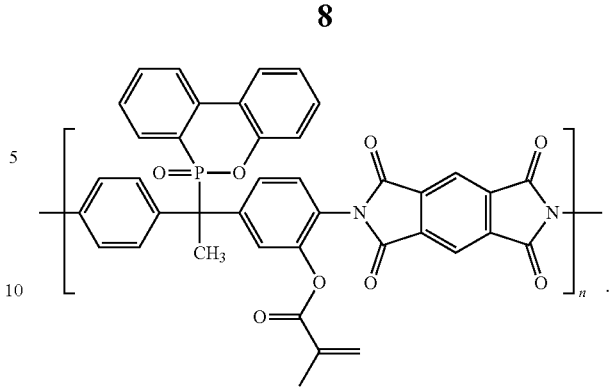

100.0 g of the modified polyimide compound (I), an epoxy resin having a chemical structural formula of

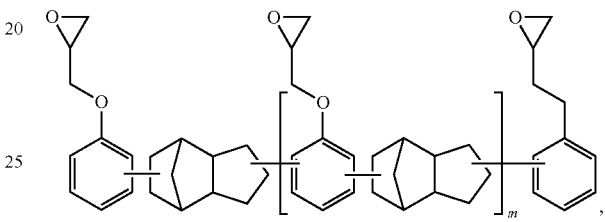

and 100.0 g of N,N-dimethylacetamide were added into a fourth container and stirred to form the resin composition. The epoxy resin and the modified polyimide compound (I) were in a molar ratio of 1:1. The resin composition had a viscosity of about 50000 cps.

Example 2

Modified polyimide compound (II) having a chemical structural formula of

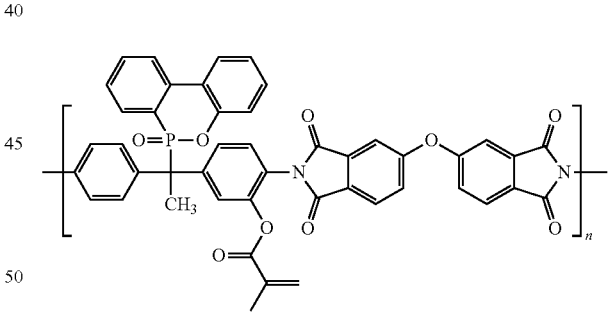

was formed. Different from the example 1, 0.7 g of the 1,2,4,5-benzenetetracarboxylic anhydride was replaced by 0.7 g of 4,4'-oxydiphthalic anhydride.

100.0 g of the modified polyimide compound (II), an epoxy resin having a chemical structural formula of

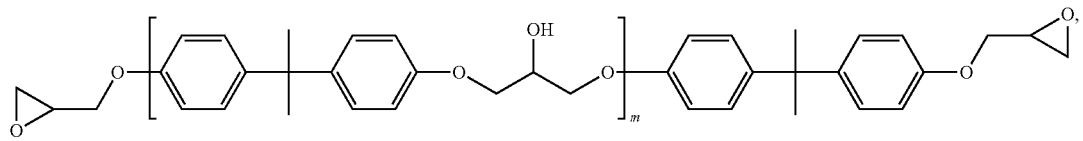

and 100.0 g of N,N-dimethylacetamide were added into a container and stirred to form the resin composition. The epoxy resin and the modified polyimide compound (II) were in a molar ratio of 1:1. The resin composition had a viscosity of about 40000 cps.

Example 3

Modified polyimide compound (III) having a chemical structural formula of

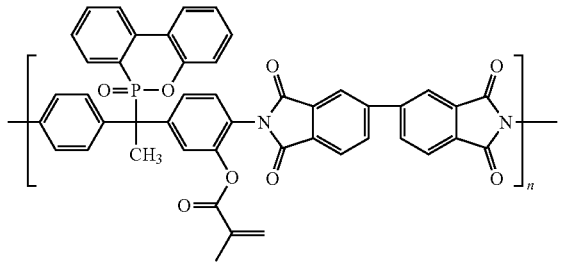

was formed. Different from the example 1, 0.7 g of the 1,2,4,5-benzenetetracarboxylic anhydride was replaced by 0.7 g of 3,4,3',4'-biphenyltetracarboxylic dianhydride.

100.0 g of the modified polyimide compound (III), an epoxy resin having a chemical structural formula of

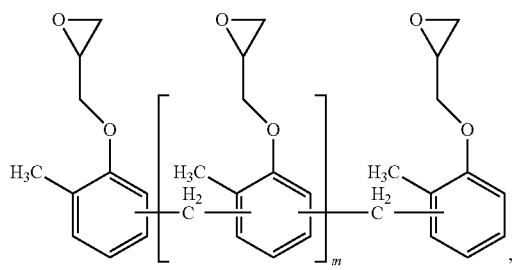

and 100.0 g of N,N-dimethylacetamide were added into a container and stirred to form the resin composition. The epoxy resin and the modified polyimide compound (III) were in a molar ratio of 1:1. The resin composition had a viscosity of about 48000 cps.

Example 4

Modified polyimide compound (IV) having a chemical structural formula of

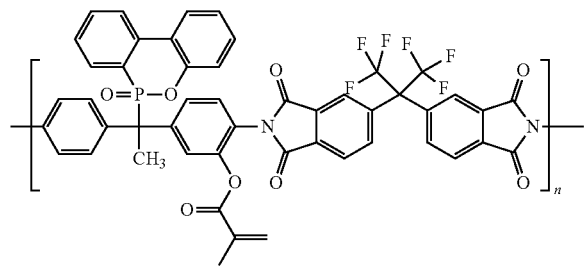

was formed. Different from the example 1, 0.7 g of the 1,2,4,5-benzenetetracarboxylic anhydride was replaced by 0.7 g of 4,4'-(hexafluoroisopropylidene)diphthalic anhydride.

100.0 g of the modified polyimide compound (IV), an epoxy resin having a chemical structural formula of

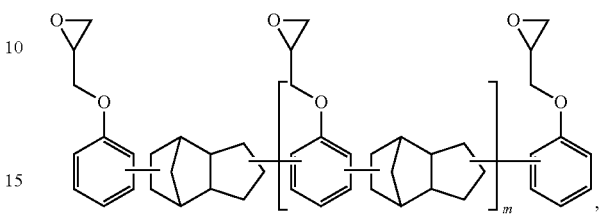

and 100.0 g of N,N-dimethylacetamide were added into a container and stirred to form the resin composition. The epoxy resin and the modified polyimide compound (IV) were in a molar ratio of 1:1. The resin composition had a viscosity of about 23000 cps.

Example 5

Modified polyimide compound (V) having a chemical structural formula of

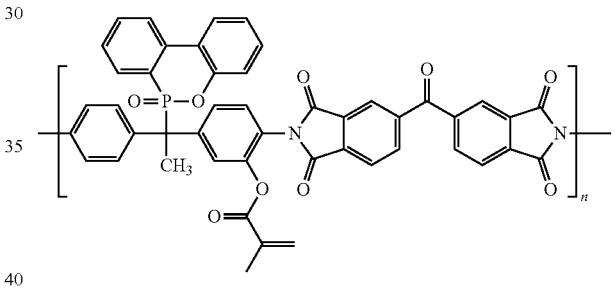

was formed. Different from the example 1, 0.7 g of the 1,2,4,5-benzenetetracarboxylic anhydride was replaced by 0.7 g of 3,3',4,4'-benzophenonetetracarboxylic dianhydride.

100.0 g of the modified polyimide compound (V), an epoxy resin having a chemical structural formula of

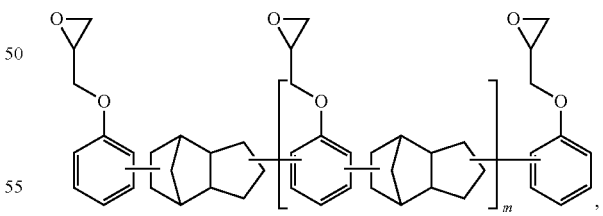

and 100.0 g of N,N-dimethylacetamide were added into a container and stirred to form the resin composition. The epoxy resin and the modified polyimide compound (V) were in a molar ratio of 1:1. The resin composition had a viscosity of about 50000 cps.

Example 6

Modified polyimide compound (VI) having a chemical structural formula of

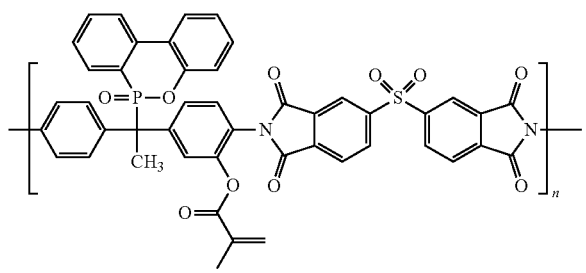

was formed. Different from the example 1, 0.7 g of the 1,2,4,5-benzenetetracarboxylic anhydride was replaced by 0.7 g of 3,3',4,4'-diphenyl sulfonetetracarboxylic anhydride.

100.0 g of the modified polyimide compound (VI), an epoxy resin having a chemical structural formula of

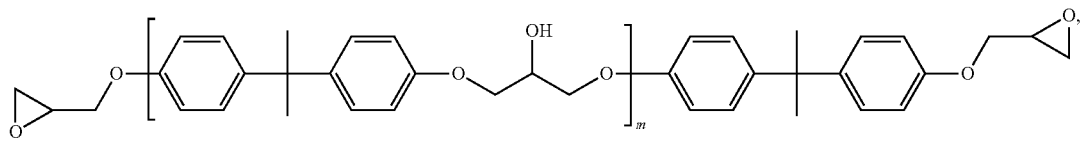

and 100.0 g of N,N-dimethylacetamide were added into a container and stirred to form the resin composition. The epoxy resin and the modified polyimide compound (VI) were in a molar ratio of 1:1. The resin composition had a viscosity of about 40000 cps.

Example 7

100.0 g of the modified polyimide compound (III) of example 3, 0.5 g of molecular sieves (Manufacturer: Tianjin Nankai University Catalyst Plant, Model: "MCM-41"), and an epoxy resin having a chemical structural formula of

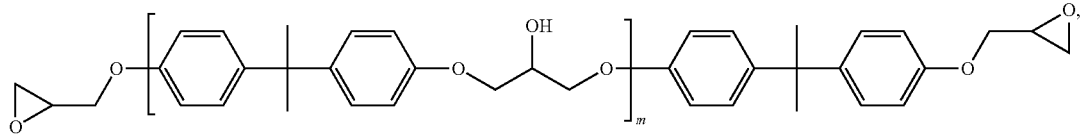

and 100.0 g of N,N-dimethylacetamide were added into a container and stirred to form the resin composition. The epoxy resin and the modified polyimide compound (III) were in a molar ratio of 1:1. The resin composition had a viscosity of about 48000 cps.

Comparative Example 1

70 g of 1,4-benzenediamine, 30 g of 3,4,3',4'-biphenyltetracarboxylic dianhydride, and 100 g of N,N-dimethylacetamide were added into a container and stirred to form a resin composition. The resin composition had a viscosity of about 40000 cps.

Comparative Example 2

70 g of 1,4-benzenediamine, 30 g of a modified 3,4,3',4'-biphenyltetracarboxylic dianhydride which was modified by methacrylic anhydride, and 100 g of N,N-dimethylacetamide were added into a container and stirred to form a resin composition. The resin composition had a viscosity of about 20561 cps.

Comparative Example 3

70 g of 1,4-benzenediamine, 30 g of 3,4,3',4'-biphenyltetracarboxylic dianhydride, 0.5 g of molecular sieves (Manufacturer: Tianjin Nankai University Catalyst Plant, Model: "MCM-41"), and 100 g of N,N-dimethylacetamide were added into a container and stirred to form a resin composition. The resin composition had a viscosity of about 25656 cps.

Seven first test samples were made. Each of the seven first test samples comprises a copper foil and a polyimide film made by heating the resin compositions of the examples 1, 2, 3, 4, 5, 6, and 7, respectively, through four heating processes. The first heating process is heating the resin composition from 25 degrees Celsius to 140 degrees Celsius and maintaining the heating of the resin composition at 140 degrees Celsius for 30 min. The second heating process is heating the resin composition from 140 degrees Celsius to 180 degrees Celsius and maintaining the heating of the resin composition at 180 degrees Celsius for 2 hours. The third heating process is heating the resin composition from 180 degrees Celsius to 200 degrees Celsius and maintaining the heating of the resin composition at 200 degrees Celsius for 2 hours. The fourth heating process is heating the resin composition from 200 degrees Celsius to 220 degrees Celsius and maintaining the heating of the resin composition at 220 degrees Celsius for 2 hours.

Three second test samples were made. Each of the three second test samples comprises a copper foil and a polyimide film made by heating the resin compositions of the comparative examples 1, 2, and 3, respectively, through two heating processes. The first heating process is heating the resin composition from 25 degrees Celsius to 140 degrees Celsius and maintaining the heating of the resin composition at 140 degrees Celsius for 30 min. The second heating process is heating the resin composition from 140 degrees Celsius to 350 degrees Celsius and maintaining the heating of the resin composition at 350 degrees Celsius for 1 hours.

Dielectric constant $D_k$, and dielectric dissipation factor $D_f$ of each of the polyimide films formed by the resin compositions of examples 1 to 7 and the resin compositions of the comparative examples 1 to 3 were tested. Thermal resistance, and copper peeling strength of the seven first test samples and the three second test samples were tested. The test results were shown in the following Table 1. The thermal resistance was tested at a temperature of 288 degrees centigrade for 10 seconds, if the polyimide film did not blister and peel off, the result of the thermal resistance test is considered passing, otherwise, the result fails.

TABLE 1

| Property | Example 1 | Example 2 | Example 3 | Example 4 | Example 5 | Example 6 | Example 7 | Comparative example 1 | Comparative example 2 | Comparative example 3 |
|---|---|---|---|---|---|---|---|---|---|---|
| $D_k$ (10 GHz) | 2.75 | 2.90 | 2.83 | 2.55 | 2.82 | 2.95 | 2.90 | 3.20 | 3.10 | 3.00 |
| $D_f$ (10 GHz) | 0.008 | 0.009 | 0.006 | 0.006 | 0.008 | 0.009 | 0.006 | 0.006 | 0.011 | 0.005 |
| Results of the thermal resistance test | Pass | Pass | Pass | Pass | Pass | Pass | Pass | Pass | Pass | Pass |
| Copper peeling strength (kgf/cm) | 0.96 | 0.93 | 0.97 | 0.96 | 0.96 | 0.93 | 0.97 | 1.02 | 1.04 | 0.98 |

According to the Table 1, the dielectric constant of the polyimide films formed by the resin compositions of examples 1, 2, 3, 4, 5, 6, and 7 are lower than the polyimide films formed by the resin compositions of the comparative examples 1, 2, and 3. In addition, the polyimide films made by the resin compositions of the examples 1, 2, 3, 4, 5, 6, and 7 have a preferred thermal resistance, respectively.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A resin composition comprising:
   a modified polyimide compound;
   an epoxy resin; and
   a solvent;
   wherein the modified polyimide compound has a chemical structural formula of

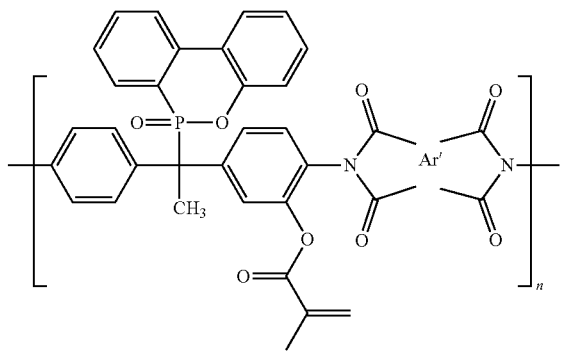

the Ar' represents a group selected from a group consisting of phenyl having a chemical structural formula of

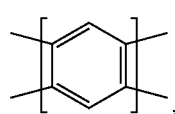

diphenyl ether having a chemical structural formula of

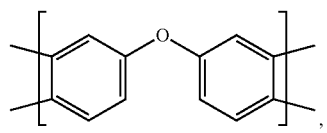

biphenyl having a chemical structural formula of

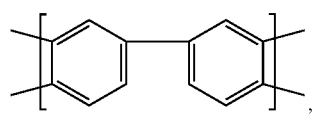

hexafluoro-2,2-diphenylpropane having a chemical structural formula of

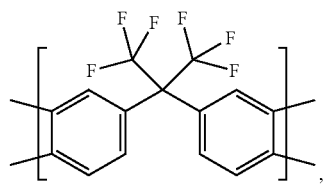

benzophenone having a chemical structural formula of

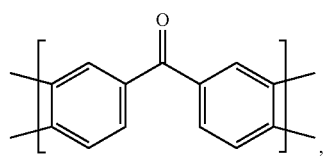

and diphenyl sulfone having a chemical structural formula of

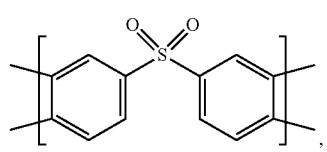

and any combination thereof, the modified polyimide compound has a degree of polymerization n of 2 to 50, the epoxy resin and the modified polyimide compound are in a molar ratio of about 0.1:1 to about 1:1.

2. The resin composition of claim 1, wherein the resin composition further comprises porous materials.

3. The resin composition of claim 2, wherein the modified polyimide compound and the porous materials are in a ratio of about 1000:1 to about 10:1 by weight.

4. The resin composition of claim 1, wherein the solvent is N,N-dimethylacetamide.

5. A polyimide film formed by heating a resin composition to undergo a polymerization reaction, wherein the resin composition comprises a modified polyimide compound, an epoxy resin, and a solvent, the modified polyimide compound and the epoxy resin are heated to undergo the polymerization reaction, the modified polyimide compound has a chemical structural formula of

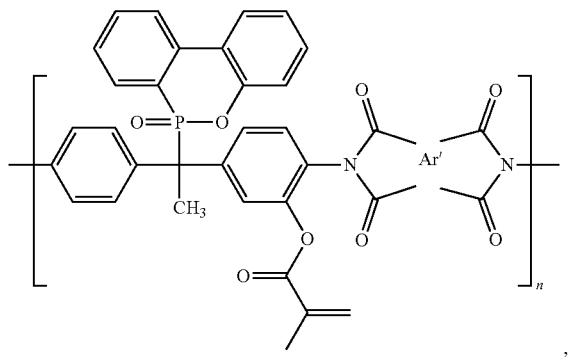

, the Ar' represents a group selected from a group consisting of phenyl having a chemical structural formula of

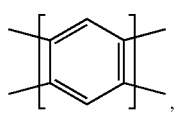

, diphenyl ether having a chemical structural formula of

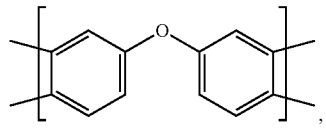

, biphenyl having a chemical structural formula of

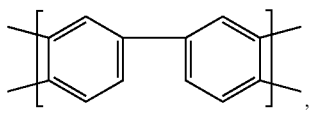

, hexafluoro-2,2-diphenylpropane having a chemical structural formula of

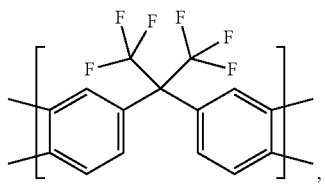

, benzophenone having a chemical structural formula of

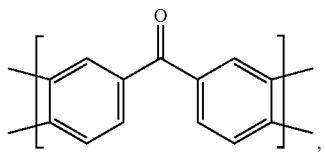

, and diphenyl sulfone having a chemical structural formula of

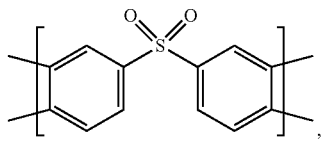

, and any combination thereof, the modified polyimide compound has a degree of polymerization n of 2 to 50, the epoxy resin and the modified polyimide compound are in a molar ratio of about 0.1:1 to about 1:1.

6. The polyimide film of claim 5, wherein the resin composition further comprises porous materials.

7. The polyimide film of claim 6, wherein the modified polyimide compound and the porous materials are in a ratio of about 1000:1 to about 10:1 by weight.

8. The polyimide film of claim 5, wherein the solvent is N,N-dimethylacetamide.

9. A modified polyimide compound having a chemical structural formula of

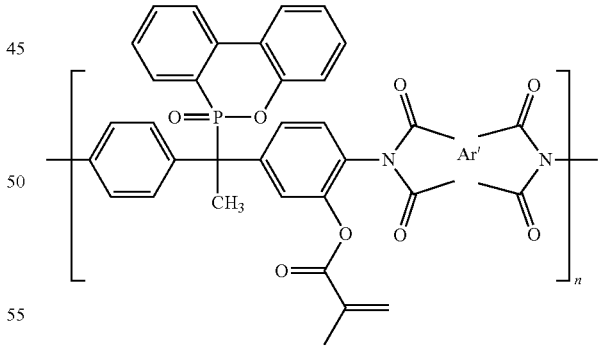

, wherein the Ar' represents a group selected from a group consisting of phenyl having a chemical structural formula of

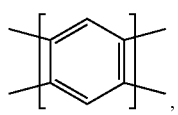

, diphenyl ether having a chemical structural formula of

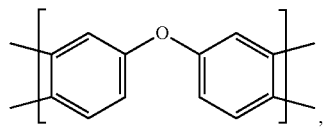

biphenyl having a chemical structural formula of

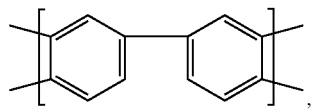

hexafluoro-2,2-diphenylpropane having a chemical structural formula of

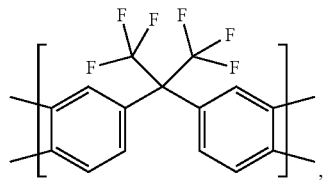

benzophenone having a chemical structural formula of

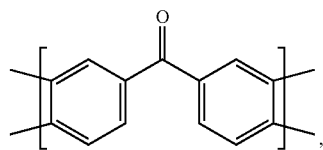

and diphenyl sulfone having a chemical structural formula of

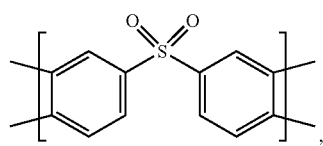

and any combination thereof, the modified polyimide compound has a degree of polymerization n of 2 to 50.

* * * * *